(12) United States Patent
Balakrishnan et al.

(10) Patent No.: US 12,003,404 B2
(45) Date of Patent: Jun. 4, 2024

(54) INFORMATION CENTRIC NETWORK PROTOCOL FOR FEDERATED LEARNING

(71) Applicant: Intel Corporation, Santa Clara, CA (US)

(72) Inventors: Ravikumar Balakrishnan, Beaverton, OR (US); Srikathyayani Srikanteswara, Portland, OR (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 650 days.

(21) Appl. No.: 17/133,314

(22) Filed: Dec. 23, 2020

(65) Prior Publication Data

US 2021/0119901 A1 Apr. 22, 2021

(51) Int. Cl.
*H04L 12/751* (2013.01)
*H04L 45/02* (2022.01)
*H04L 47/283* (2022.01)
*H04L 47/32* (2022.01)
*H04W 8/00* (2009.01)

(52) U.S. Cl.
CPC ............ *H04L 45/08* (2013.01); *H04L 47/283* (2013.01); *H04L 47/32* (2013.01); *H04W 8/005* (2013.01)

(58) Field of Classification Search
None
See application file for complete search history.

(56) References Cited

U.S. PATENT DOCUMENTS

| | | | | |
|---|---|---|---|---|
| 10,863,343 | B2* | 12/2020 | Nallampatti Ekambaram | ............ H04L 45/021 |
| 11,140,025 | B2* | 10/2021 | Jha | ............ H04L 41/12 |
| 11,470,005 | B2* | 10/2022 | Mermoud | ............ H04L 45/28 |
| 2019/0230566 | A1* | 7/2019 | Schneider | ............ H04W 40/12 |
| 2020/0027022 | A1* | 1/2020 | Jha | ............ G06N 3/08 |
| 2021/0037107 | A1* | 2/2021 | Klenk | ............ H04L 12/1886 |
| 2022/0346132 | A1* | 10/2022 | Shen | ............ G06N 20/00 |

OTHER PUBLICATIONS

Bonawitz, Keith, "Towards Federated Learning at Scale: System Design", arXiv:1902.01046, (Mar. 22, 2019), 15 pgs.

* cited by examiner

*Primary Examiner* — Eunsook Choi
(74) *Attorney, Agent, or Firm* — Schwegman Lundberg & Woessner, P.A.

(57) ABSTRACT

System and techniques for information centric network (ICN) protocol for federated learning are described herein. An interest packet may be received on a first interface to start a federated learning round. Here, the interest packet includes a participant criterion and a federated learning round expiration. An entry, that includes the federated learning round expiration, is created in a pending interest table (PIT) for the interest packet. The interest packet is forwarded, in accordance with a forwarding information base (FIB), to a set of interfaces before the federated learning round expiration. When a data packet from a node, that meeting the participant criterion, is received in response to the interest packet, the data packet is forwarded on the first interface in accordance with the PIT entry.

23 Claims, 9 Drawing Sheets

INFORMATION CENTRIC NETWORK PROTOCOL FOR FEDERATED LEARNING

TECHNICAL FIELD

Embodiments described herein generally relate to computer networking to support distributed artificial intelligence and more specifically to information centric network protocol for federated learning.

BACKGROUND

Federated learning described a technique whereby a global model is trained with input from a federation of devices. The devices in the federation perform training on a copy of the model locally, with local data. When the training is complete, the device provides its updates to the global model. These various updates are aggregated and added to the global model. The federated learning protocol iteratively allows clients (e.g., participating devices) to download a centrally trained model from a server, update it with its own data and upload the model updates (e.g., a gradient update) back to the server. The server then aggregates updates from multiple clients to update the global model.

Information centric networking (ICN) is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
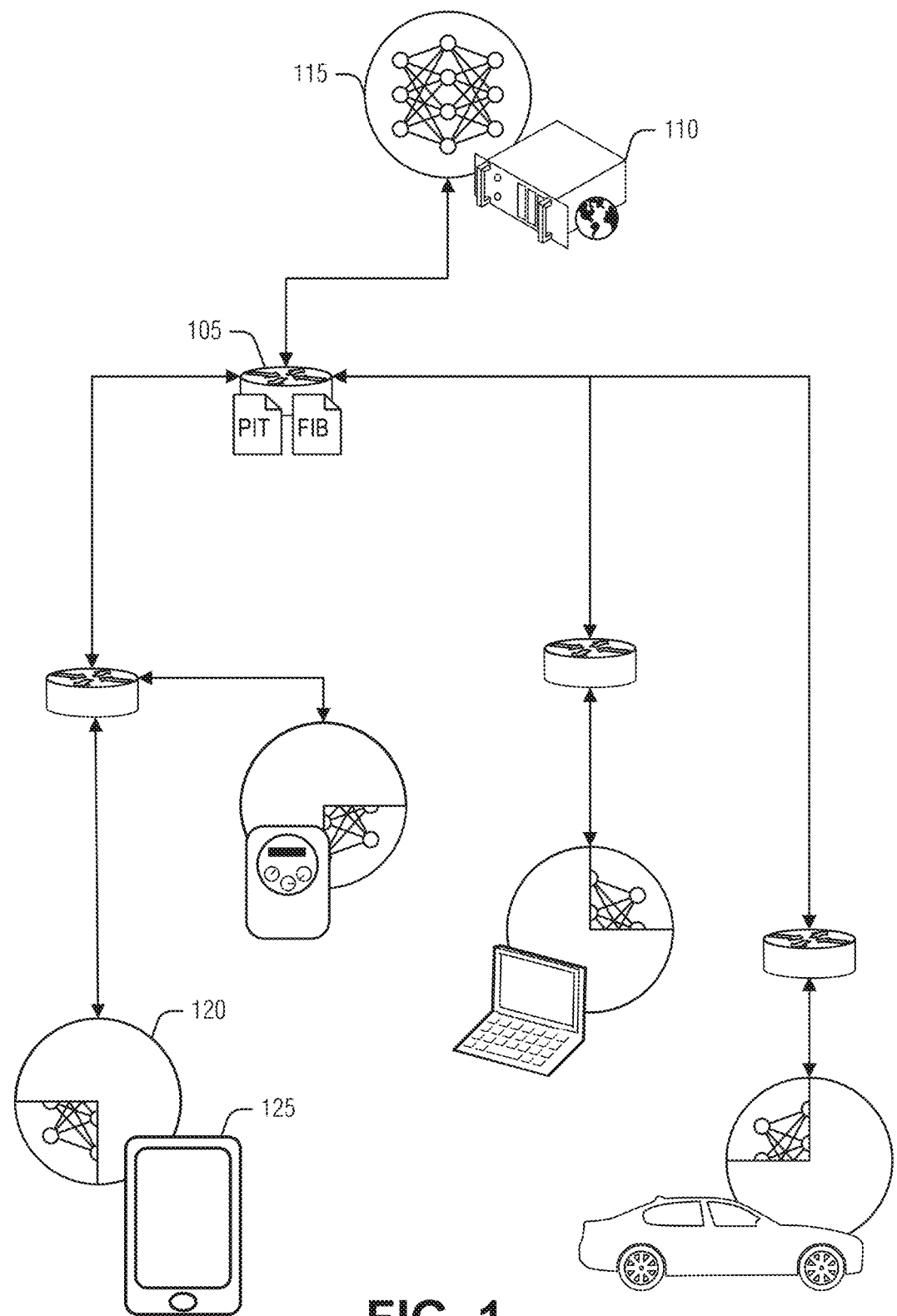
FIG. 1 is an example of an environment including a system to implement an information centric network protocol for federated learning, according to an embodiment.

Federated Learning over wireless edge networks is beneficial because data may be maintained locally, at client devices, while the server (e.g., edge server) gains the benefits clients compute capabilities to accelerate model training. However, several challenges may arise when implementing federated learning over wireless edge networks. For example, discovering compute clients in the network can be rigorous and require application-level interaction between the central (of the model) server and clients. Also, compute cycles available at clients may be time-varying, which leads to a "straggler" issue where slow clients (e.g., those that report model updates after a learning epoch) may delay model updates or may lead to model divergence due to lost model updates. End-to-end latency from between the central model server and the clients may further exacerbate the straggler issue.

Current federated learning systems generally rely on an application layer (as opposed to physical, media, or transport layers in the Open System Interconnection (OSI) network model) to establish a bidirectional stream between the central server and federated clients. In each federated learning round, the connected clients are selected to participate in federated learning based on various metrics, such as an optimal number of participating devices. For each federated learning round to be successful, a sufficient number of devices need to report model updates in time to the server. If this does not occur, generally, the round of learning is abandoned, and the model is not updated.

The use of application layer connectivity between participating devices may require multiple communication rounds in addition to establishing and maintaining the communication link (e.g., stream) between clients and server. Checking-in devices to the central server, maintaining connectivity for context exchange or capability reporting, selecting clients for each round, and flow control are all generally handled at the application layer. The combination of this application layer interaction and the numerous networking tasks to maintain connections between the clients and central model server results in a resource intensive architecture to implement federated learning. Such a structure general results in inefficiencies, which may be exacerbated if, for example, low-resource devices have difficulty reporting model updates within a given learning epoch, resulting in further waste when the model cannot be updated.

To address the issues noted above, an ICN protocol may be used to eliminate on-going connections between the central model server and participating client nodes. The ICN protocol is a light-weight approach to identify or poll clients at the network layer, which may take advantage of the storage and compute capabilities of intermediate nodes present in many ICN networks. The ICN protocol, extended with the present techniques, addresses discovering and selecting clients for federated learning to enable accelerating training convergence time of federated learning.

The ICN protocol described herein uses the storage or computational capabilities of network nodes to aid in discovery, selection of clients to participate in a federated learning round, and control flow for the process. This enables network nodes, at the network level, to identify and filter the clients satisfying requirements for federated learning and avoids the overheads associated with connection-based protocols of current federated learning implementations. Additional details and examples are described below.

Figure 2:
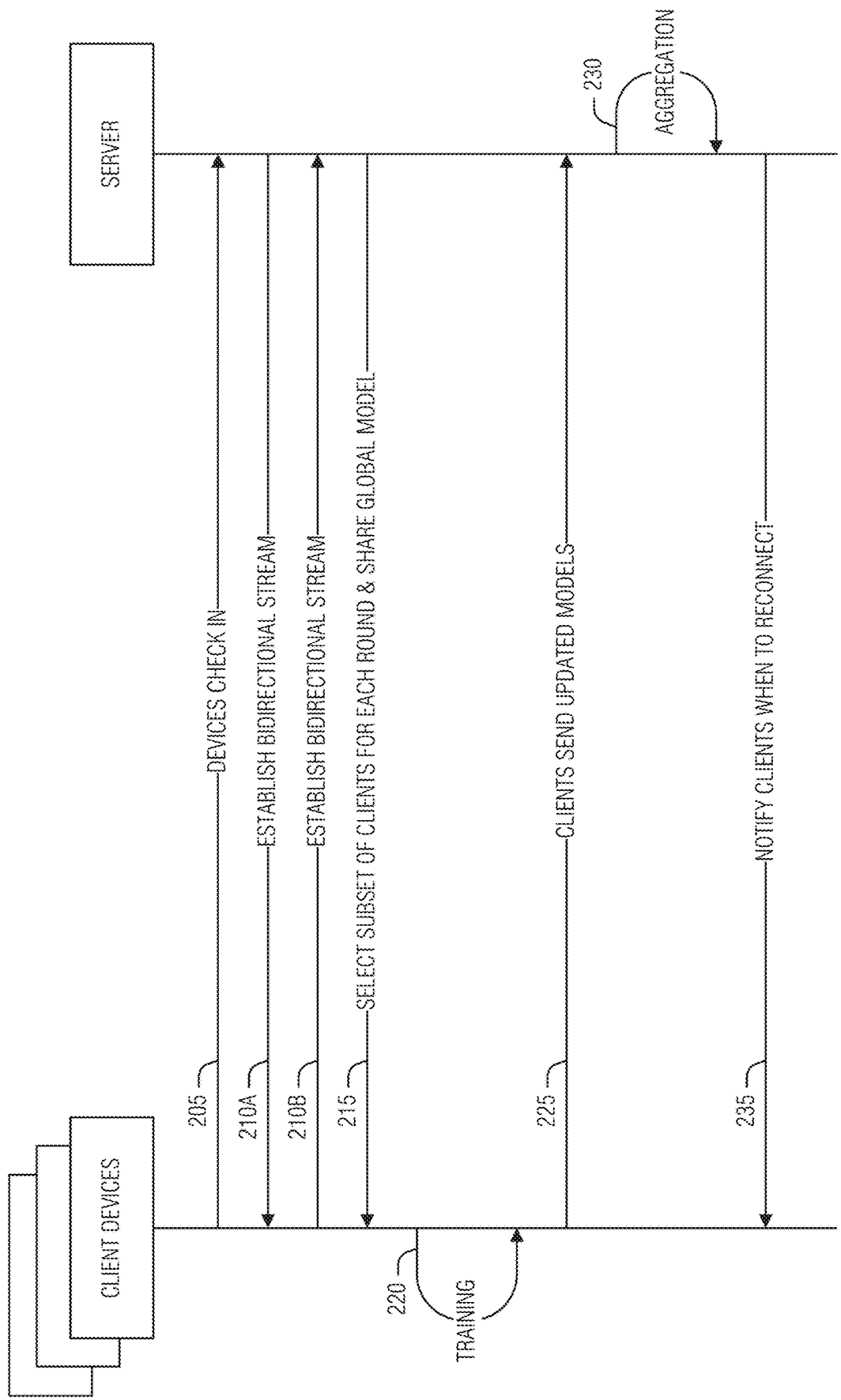
FIG. 2 illustrated an example of a federated learning round of communication, according to an example.

FIG. 1 is an example of an environment including a system to implement an information centric network protocol for federated learning, according to an embodiment. As illustrated, an ICN node 105 (e.g., router with a local pending interest table (PIT) and forward information base (FIB)) is connected through a first (e.g., upstream) interface to a server 110 that houses a global model 115. Here, the global model is a model that is created through a training process, such as an artificial neural network (ANN), or other artificial intelligence structure. The ICN node 105 is connected to other ICN routers, and ultimately to several client devices, such as the client device 125 (e.g., client, client node, etc.). Each of the client devices includes a portion 120 of the global model 115 to represent that each client device 125 provides a partial update to the training of the global model 115 over any given federated learning epoch. FIG. 2 provides some additional detail of federated learning, and the epoch.

As illustrated, the client devices are typical edge devices, such as a mobile phone (e.g., client device 125), a utility meter, a laptop computer, or a vehicle. The ICN nodes connecting the client devices may be standalone routers, edge servers, or other devices connected (e.g., wired or wirelessly) to the ICN node 105. The server 110 may reside in a data center (e.g., accessed through a cloud, the Internet, etc.) or may be an edge server, among other things. However, the server 110 operates to house the global model 115, to aggregate updates from the client devices, to apply the updates to the global model 115, to distribute the global model to the client devices, and to coordinate federated learning to facilitate these activities among the client devices.

The ICN node 105 includes several physical interfaces to connect to other nodes. Generally, an interface in which an interest packet is received may be called an "upstream" interface, and an interface upon which the interest packet is sent, and a responsive data packet is received may be called a "downstream" interface. As these terms relate to the type of packet sent and received, they may change over time.

The ICN node 105 includes processing circuitry configured (e.g., hardwired such as printed circuits, configured by software when in operation, or a combination thereof), to implement the ICN protocol for federated learning. Thus, the processing circuitry is configured to receive an interest packet to start a federated learning round is received on a first interface (e.g., upstream interface from the server 110). Here, the interest packet name specifies that the interest packet relates to a federated learning round. The name (as described with respect to FIG. 3) may be hierarchical. Generally, the name will include a designator for the model 115 at a higher level of the hierarchy and more specific details about the specific federated learning round lower in the hierarchy. This enables clients (such as client 125) to perform name-scope matching to determine whether or not to respond to the interest packet.

In an example, the interest packet includes a participant criterion and a federated learning round expiration. These values may be part of the interest packet name or may be included in additional fields of the interest packet. When placed in the name, a more generic name matching technique may be employed. However, this may lead to a more complex name, which may have undesirable side-effects (e.g., more design time, more likely to be ignored by devices, etc.). The participant criterion is a metric by which a client device 125 or intermediate node may determine whether or not to participate in a federated learning round. In an example, the participant criterion is a time to complete the federated learning round. Here, the criterion establishes a time period in which the client device 125 must complete the local training on the partial model update 120. The client device 125 may assess the workload in light of local computing resources and determine whether it can complete the task in the allotted time. In an example, the participant criterion is a round-trip communication time. Other participant criteria may also be used, such as computation accuracy, among others.

In an example, the processing circuitry is configured to update the FIB with the participant criterion. Here, instead of relying only upon the client 125 to determine whether to participate in a federated learning round, the ICN node 105 also participates by discriminating upon which second interfaces (e.g., downstream interfaces) to forward the interest packet using the participant criterion entry in the FIB. Generally, if a data packet response has client device metrics, such as round-trip-time, then the FIB may record those metrics for downstream interfaces. When there are no client devices with a response time under the participant criterion, for example, then the interest packet may not be sent to that interface. This may reduce processing time at the ICN node 105 and prevent network congestion or work being performed at client devices that will fail to meet the federated learning round reporting requirements.

In an example, the name (e.g., or a field) of the interest packet includes a computation indication. Here, the computation indication is one of a finite set of computation indications. These examples note that the federated learning round is looking for a particular type of update to the global model 115, where the total number of relevant computations are embodied by the finite set of computations. In an example, the computation indication may be an index into the finite set of computations known by all client devices. In an example, the computation indication may be code, a script, or the like that the client device 125 may use directly to perform the computation.

In an example, the interest packet is one of a set of interest packets. Here, the set of interest packets have a common indication (e.g., portion of the name) of the federated learning round and a unique indication that is different between each of the set of interest packets. In an example, the unique indication uniquely identifies a participant (e.g., the client device 125). This interest packet formulation uses the common indication to relate the various interest packets to a given federated learning round but uses a separate interest packet for each one participant. This enables the server 110 more fine grained control over the client devices. This fine grained control may be preceded by a participant selection process, which may involve querying possible participants to determine which are available, and then following up with the set of interest packets. Thus, in an example, the interest packet follows a second interest packet that is soliciting data packets of participants that can participate in the federated learning round. In an example, the client device 125 provides a second data packet in response to the second interest packet when it meets the participant criterion and has available resources to participate in the federated learning round. Other criteria that may be used in client device selection by the server 110 may include the client device 125 having been in a certain (e.g., specified) geographic area for a specified period of time. In an example, the other criteria may include the client device 125 meeting metrics of the training data set, such as a specified sample size, collection period, exposure (e.g., to different subjects), etc. In an example, the other criteria may include whether the client device 125 has acquired (e.g., generated, measured, sensed, etc.) new data since last participating in a federated learning round.

The processing circuitry is configured to create an entry in its PIT for the interest packet. Here, the entry includes the federated learning round expiration. Thus, the standard ICN PIT entry creation is modified to include the time at which the federated learning round expires. The federated learning round expiration may be leveraged for a network level filter of timely or late data packet responses to the interest packet. In an example, creating the entry in the PIT includes establishing a criterion for removal of the PIT entry before which the PIT entry is not removed by a matching data packet. In an example, the criterion is the federated learning round expiration. In an example, the criterion is a count of data packets in response to the interest packet. In these examples, the PIT entry is "sticky" and not generally removed upon receipt at the ICN node 105 of a data packet matching the interest packet as would be the case in a traditional ICN. Thus, several matching data packets may be received and passed onto the first interface to the server 110 as long as the removal criterion is not yet met.

The processing circuitry is configured to forward the interest packet, in accordance with the FIB, to a set of interfaces before the federated learning round expiration. Thus, the interest from the server 110 is propagated through the ICN network to the client devices, including the client device 125 during the federated learning round. As many of the illustrated client devices may be wireless, connectivity may come and go. Here, the ICN node 105 may keep a copy of the interest packet and transmit it to new connections (e.g., new interfaces) as they connect. This may enable an efficient and dynamic communication between the server 110 and the client devices not generally available at the traditional application layer federated learning implementations. In an example, the set of interfaces are selected based on the participant criterion in the FIB. As noted above, the FIB may be used to filter which interfaces have client devices that meet the participant criterion and which interfaces do not, helping to reduce wasted processing or network transmission.

The processing circuitry is configured to receive a data packet, on a second interface in the set of interfaces (e.g., a downstream interface), from a node (e.g., the client device 125) in response to the interest packet. In an example, the data packet includes an update to the global model 115. In an example, the update is computed from data locally at a computation node (e.g., the client device 125). In an example, the update being absent of the data used to calculate the update. These examples illustrate an advantage of federated learning; the ability to train the global model 115 without exposing possibly private or sensitive local data to other parties, such as the server 110. Moreover, because the training data is not transferred to the server 110, federated learning results in less network utilization than more centralized training techniques.

The processing circuitry is configured to forward the data packet on the first interface (e.g., upstream interface) in accordance with the PIT entry. In an example, forwarding the data packet on the first interface in accordance with the PIT entry includes discarding the interest packet when the interest packet is received after the federated learning round expiration. In an example, the processing circuitry is configured to receive, on the second interface, a second data packet in response to the interest packet and discard the second data packet when the second data packet is received after the federated learning round expiration. Thus, stragglers are filtered at the network level when the data packet response is outside the federated learning round expiration.

The ICN protocol for federated learning enables a network level recruitment and management of client devices based on the ICN packet names and management of the PIT and FIB at the ICN node 105. This is a lightweight framework for federated learning that is flexible with respect to connecting and reconnecting client devices and reduces wasteful network connection overhead.

FIG. 2 illustrated an example of a federated learning round of communication, according to an example. The illustration follows a traditional, application layer, federated learning communications model to illustrate the common and contrasting elements to the ICN protocol for federated learning.

The federated learning may use a multi-access edge computing (MEC) server that learns a global machine learning model from multiple clients; each of which learn a local machine learning model from the dataset available to them. Instead of the clients sending all the data to a central MEC server to train a machine learning algorithm-such as a deep neural network, recurrent neural network (RNN) etc.—federated learning enables the clients to train a model on their data locally and only share the model weights to the MEC server. The MEC server receives model updates from several clients and calculates the average (or other statistical combination) of the model weights to form the global model. For the next round of client training, the MEC server propagates the global model weights to clients. A federated learning epoch is the time between the beginning of the round and the end of the round. Any data received after the epoch is not part of the round, though the data may be used in a subsequent round.

At 205, client devices periodically check in to the server and open a bidirectional stream (210A and 210B). The stream (210A and 210B) is used to track liveness and orchestrate multi-step communication. At 215, the server selects a subset of clients based on goals like optimal number of participating devices for each round. For the devices that are not selected, the server responds with instructions to reconnect at a later time (not shown).

At 220, after selected clients receive the global model from the server, the selected clients and perform local training. At 225, each client reports the model update back to the server. The server waits for participating devices to report updates. In an example, when a sufficient number of clients do not report in time (e.g., within the learning epoch for this round), the round is abandoned (e.g., the global model is not updated and the model updates from the clients are discarded). Otherwise, at 230, the federated learning round is successful, and the global model is updated with the aggregated results reported by the clients. At 235, the server notifies clients when to report back (e.g., for a next federated learning round.

With this traditional federated learning communication exchange in mind, the following illustrates the ICN protocol for federated learning. Again, an ICN (e.g., named data network (NDN) approach is used to discover and select clients "on-the-fly" using the compute and storage capabilities within ICN network nodes. In an example, the existing fields in the ICN message exchange are used to enable implicit identification and selection of clients that can satisfy the federated learning criteria. Contrary to connection-based protocols, ICN uses a connectionless approach where an interest-data packet exchange enables a publish-subscribe model of message exchanges.

The ICN protocol for federated learning starts when the central server constructs several interest packets based on the number of clients expected to participate in the round. In an example, in the application parameters field of the interest packet, the server may indicate the criteria the clients must satisfy to participate in the federated learning round. Example criteria may include the time required at each client to complete one training round on the model, or the end-to-end communication time between server and client. This may be computed as the round-trip time of exchange of an interest and data packet between the server and client. In an example, the criteria may include the time-to-live (TTL) for the interest packet based on the interval before which the server requires a response. This may be use by intermediate routers to remove the PIT entry for the interest packet if the TTL has already been exceeded.

The intermediate nodes may store the interest packets in their PIT until they get a data packet of interest from clients. For example, at a router, the application parameters field may be checked to determine whether the time to respond is expired. In this case, the routers do not forward the interest packet and remove the PIT entry. In an example, if the time to respond is not expired, the router may forward this further along the route of clients.

At a client, the client may compute its capability according to the criteria indicated in the application parameters. If clients can satisfy the criteria, they respond with a data packet indicating their capability. The server receives data packets from several clients and uses the capability information to determine if the clients can be scheduled for the round. In this case, an additional round may be used where the server issues another set of interest packets with unique names of the clients that are selected for the round. The clients may then respond with data packet containing the computed model updates. In an example, the clients upon receiving the initial interest packet, directly (immediately, or without waiting for another interest packet) perform the local training if they satisfy the criteria indicated in the interest packet. They then respond with a data packet which includes the computed model updates.

In an example, a single interest packet for several clients may be used to solicit multiple responses from the multiple clients. This can be achieved by using a unique name that describes the computation that needs to be done. For example, there may be a generic name for a local gradient update, that each client will substitute with. In an example, the number of hops for the interest packet may be limited in an attempt to get the correct (e.g., sufficient under the federated learning model) number of responses. Here, the server may estimate the number of participants needed and the number of hops that will likely result in the correct number of participants. When each client receives the generic interest packet, it substitutes its own data, performs the computations and returns the results. In these examples, the network allows multiple responses for one interest packet (e.g., a sticky PIT entry) until the interest times out.

The ICN protocol for federated learning provides several advantages over traditional techniques. For example, the ICN protocol is a connectionless approach in which the network filters and identifies the clients for each federated learning round. Also, only the clients that can satisfy the performance criteria respond to the interest from the central server. This helps to avoid some unnecessary or redundant bidirectional stream traffic or overhead between server and clients. Further, as the application parameters is an optional field in an NDN interest packet, a standard ICN implementation may be extended to indicate the performance criteria that the clients must satisfy in order to participate in a given round. This facilitates on-the-fly selection of clients at the network-layer without several message exchanges between the server and client.

Figure 3:
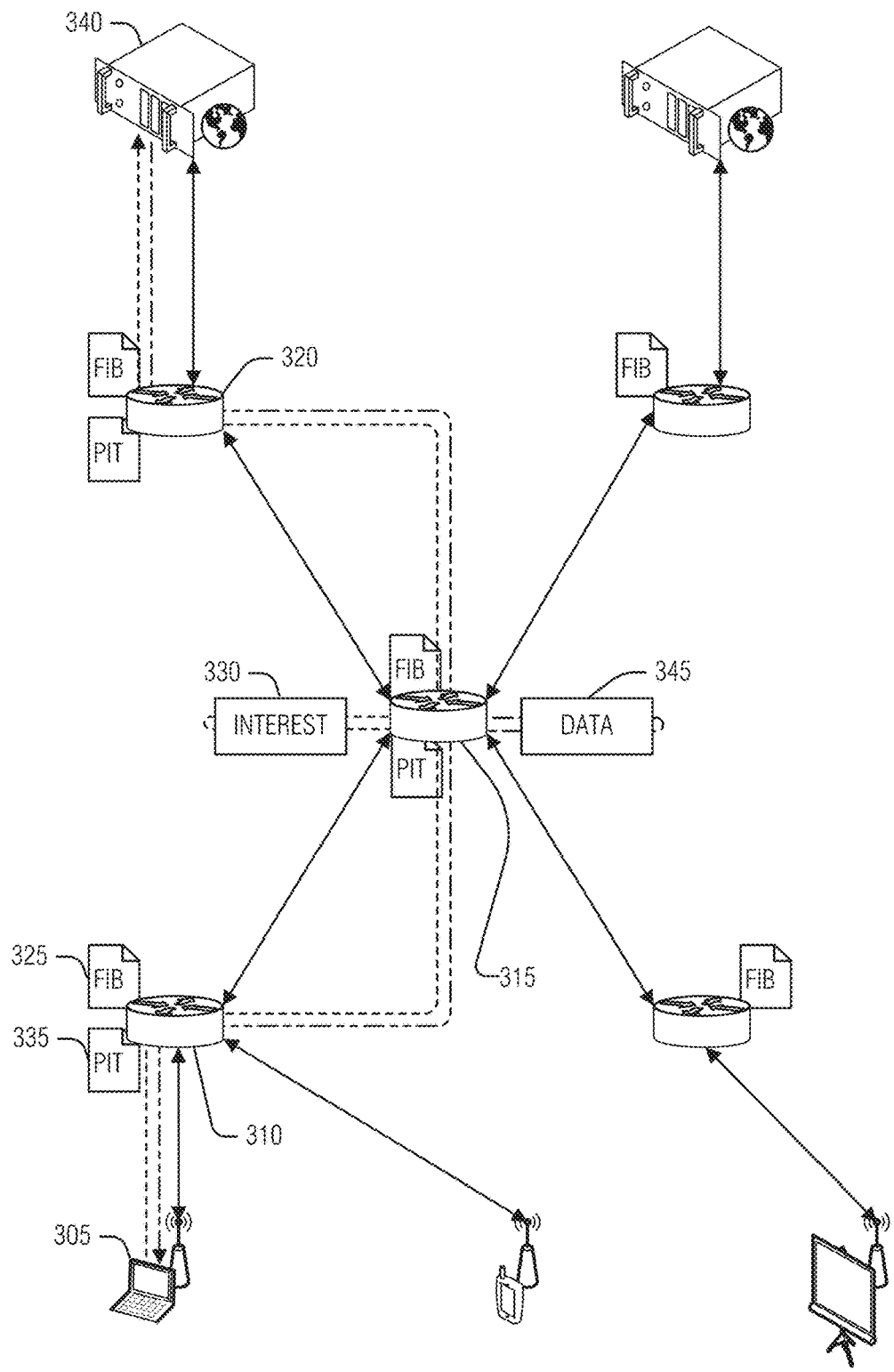
FIG. 3 illustrates an example information centric network (ICN), according to an example.

FIG. 3 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 305 (e.g., subscriber) requests named content from the network itself. The content request may be called an interest and transmitted via an interest packet 330. As the interest packet traverses network devices (e.g., network elements, routers, switches, hubs, etc.)—such as network elements 310, 315, and 320—a record of the interest is kept, for example, in a pending interest table (PIT) at each network element. Thus, network element 310 maintains an entry in its PIT 335 for the interest packet 330, network element 315 maintains the entry in its PIT, and network element 320 maintains the entry in its PIT.

When a device, such as publisher 340, that has content matching the name in the interest packet 330 is encountered, that device 340 may send a data packet 345 in response to the interest packet 330. Typically, the data packet 345 is tracked back through the network to the source (e.g., device 305) by following the traces of the interest packet 330 left in the network element PITs. Thus, the PIT 335 at each network element establishes a trail back to the subscriber 305 for the data packet 345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher. "www.somedomain.com," a sub-category, "videos," and the canonical identification "v8675309." As an interest 330 traverses the ICN, ICN network elements will generally attempt to match the name to a greatest degree. Thus, if an ICN element has a cached item or route for both "www-.somedomain.com or videos" and "www.somedomain.com or videos or v8675309." the ICN element will match the later for an interest packet 330 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 330 to data cached in the ICN element. Thus, for example, if the data 345 named in the interest 330 is cached in network element 315, then the network element 315 will return the data 345 to the subscriber 305 via the network element 310. However, if the data 345 is not cached at network element 315, the network element 315 routes the interest 330 on (e.g., to network element 320). To facilitate routing, the network elements may use a forwarding information base 325 (FIB) to match named data to an interface (e.g., physical port) for the route. Thus, the FIB 325 operates much like a routing table on a traditional network device.

In an example, additional meta-data may be attached to the interest packet 330, the cached data, or the route (e.g., in the FIB 325), to provide an additional level of matching. For example, the data name may be specified as "www.some-domain.com or videos or v8675309," but also include a version number—or timestamp, time range, endorsement, etc. In this example, the interest packet 330 may specify the desired name, the version number, or the version range. The matching may then locate routes or cached data matching the name and perform the additional comparison of meta-data or the like to arrive at an ultimate decision as to whether data or a route matches the interest packet 330 for respectively responding to the interest packet 330 with the data packet 345 or forwarding the interest packet 330.

ICN has advantages over host-based networking because the data segments are individually named. This enables aggressive caching throughout the network as a network element may provide a data packet 330 in response to an interest 330 as easily as an original author 340. Accordingly, it is less likely that the same segment of the network will transmit duplicates of the same data requested by different devices.

Fine grained encryption is another feature of many ICN networks. A typical data packet 345 includes a name for the data that matches the name in the interest packet 330. Further, the data packet 345 includes the requested data and may include additional information to filter similarly named data (e.g., by creation time, expiration time, version, etc.). To address malicious entities providing false information under the same name, the data packet 345 may also encrypt its contents with a publisher key or provide a cryptographic hash of the data and the name. Thus, knowing the key (e.g., from a certificate of an expected publisher 340) enables the recipient to ascertain whether the data is from that publisher 340. This technique also facilitates the aggressive caching of the data packets 345 throughout the network because each data packet 345 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 4:
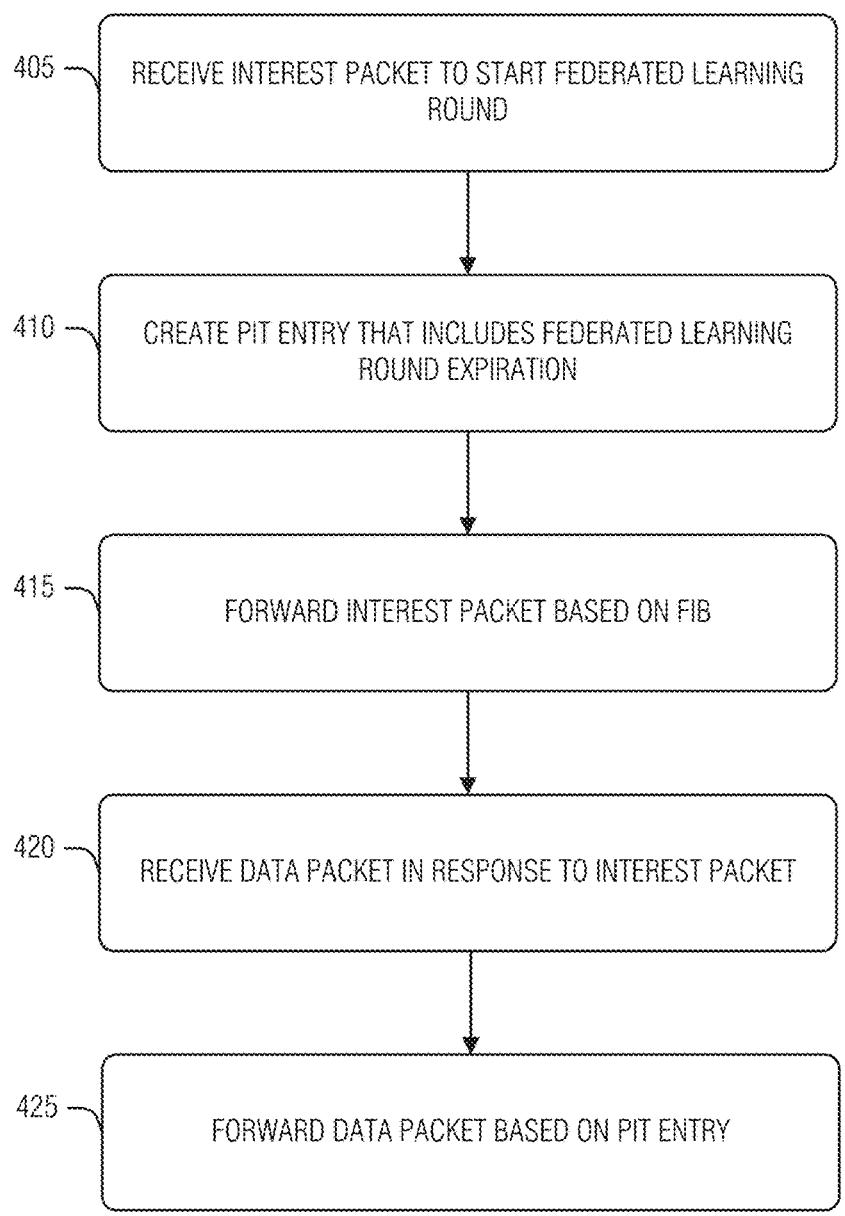
FIG. 4 illustrates a flow diagram of an example of a method for information centric network protocol for federated learning, according to an embodiment.

FIG. 4 illustrates a flow diagram of an example of a method 400 for information centric network protocol for federated learning, according to an embodiment. The operations of the method 400 are performed with computational hardware, such as that described about (e.g., an ICN router) or below (e.g., processing circuitry).

At operation 405, an interest packet to start a federated learning round is received on a first interface (e.g., upstream interface). In an example, the interest packet includes a participant criterion and a federated learning round expiration. In an example, the name of the interest packet includes a computation indication. Here, the computation indication is one of a finite set of computation indications. In an example, the participant criterion is a time to complete the federated learning round. In an example, the participant criterion is a round-trip communication time. In an example, the method 400 includes the operation of updating the FIB with the participant criterion.

In an example, the interest packet is one of a set of interest packets. Here, the set of interest packets have a common indication of the federated learning round and a unique indication that is different between each of the set of interest packets. In an example, the unique indication uniquely identifies a participant.

In an example, the interest packet follows a second interest packet that is soliciting data packets of participants that can participate in the federated learning round. In an example, a device provides a second data packet in response to the second interest packet when it meets the participant criterion and has available resources to participate in the federated learning round.

At operation 410, an entry in a PIT is created for the interest packet. Here, the entry includes the federated learning round expiration. In an example, creating the entry in the PIT includes establishing a criterion for removal of the PIT entry before which the PIT entry is not removed by a matching data packet. In an example, the criterion is the federated learning round expiration. In an example, the criterion is a count of data packets in response to the interest packet.

At operation 415, the interest packet is forwarded, in accordance with a forwarding information base (FIB), to a set of interfaces before the federated learning round expiration. In an example, the set of interfaces are selected based on the participant criterion in the FIB.

At operation 420, a data packet is received, on a second interface in the set of interfaces, from a node in response to the interest packet. This node meets the participant criterion. In an example, the data packet includes an update to a model. In an example, the update computed from data locally at a computation node. In an example, the update being absent of the data used to calculate the update.

At operation 425, the data packet is forwarded on the first interface in accordance with the PIT entry. In an example, forwarding the data packet on the first interface in accordance with the PIT entry includes discarding the interest packet when the interest packet is received after the federated learning round expiration. In an example, the method 400 includes operations to receive, on the second interface, a second data packet in response to the interest packet and discard the second data packet when the second data packet is received after the federated learning round expiration.

Figure 5:
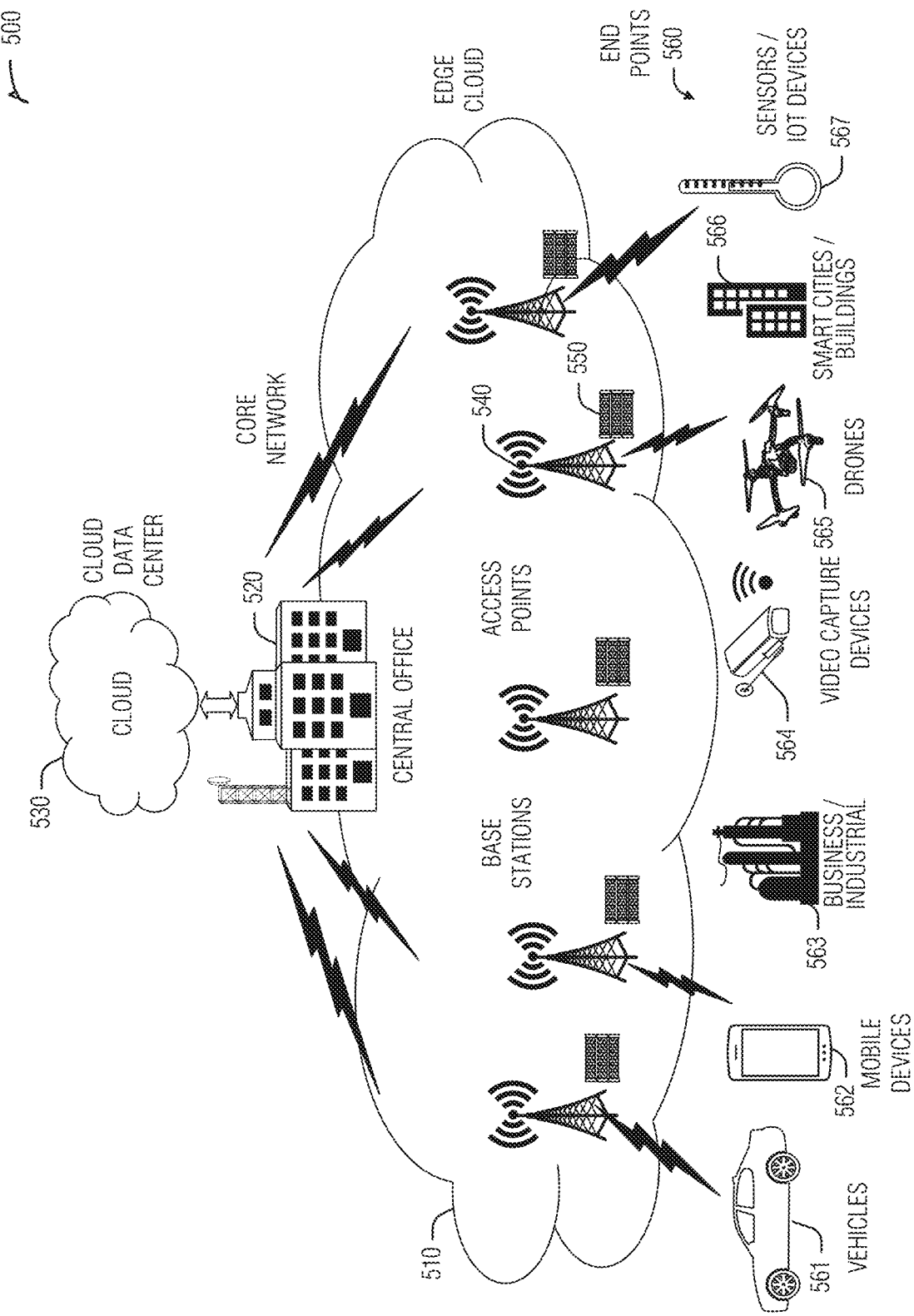
FIG. 5 illustrates an overview of an edge cloud configuration for edge computing.

FIG. 5 is a block diagram 500 showing an overview of a configuration for edge computing, which includes a layer of processing referred to in many of the following examples as an "edge cloud". As shown, the edge cloud 510 is co-located at an edge location, such as an access point or base station 540, a local processing hub 550, or a central office 520, and thus may include multiple entities, devices, and equipment instances. The edge cloud 510 is located much closer to the endpoint (consumer and producer) data sources 560 (e.g., autonomous vehicles 561, user equipment 562, business and industrial equipment 563, video capture devices 564, drones 565, smart cities and building devices 566, sensors and IoT devices 567, etc.) than the cloud data center 530. Compute, memory, and storage resources which are offered at the edges in the edge cloud 510 are critical to providing ultra-low latency response times for services and functions used by the endpoint data sources 560 as well as reduce network backhaul traffic from the edge cloud 510 toward cloud data center 530 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 6:
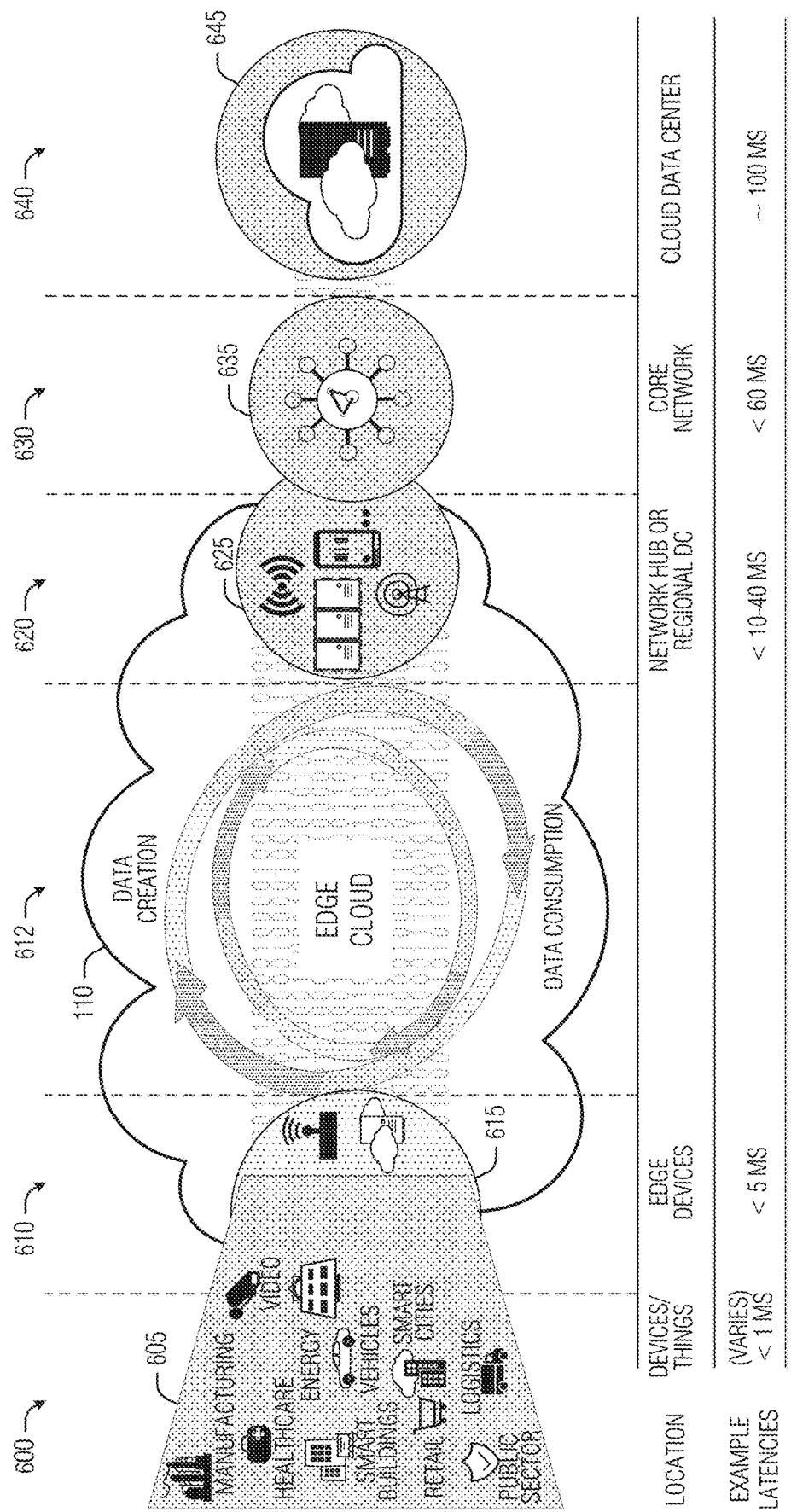
FIG. 6 illustrates operational layers among endpoints, an edge cloud, and cloud computing environments.

FIG. 6 illustrates operational layers among endpoints, an edge cloud, and cloud computing environments. Specifically, FIG. 6 depicts examples of computational use cases 605, utilizing the edge cloud 510 among multiple illustrative layers of network computing. The layers begin at an endpoint (devices and things) layer 600, which accesses the edge cloud 510 to conduct data creation, analysis, and data consumption activities. The edge cloud 510 may span multiple network layers, such as an edge devices layer 610 having gateways, on-premise servers, or network equipment (nodes 615) located in physically proximate edge systems; a network access layer 620, encompassing base stations, radio processing units, network hubs, regional data centers (DC), or local network equipment (equipment 625); and any equipment, devices, or nodes located therebetween (in layer 612, not illustrated in detail). The network communications within the edge cloud 510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 600, under 5 ms at the edge devices layer 610, to even between 10 to 40 ms when communicating with nodes at the network access layer 620. Beyond the edge cloud 510 are core network 630 and cloud data center 640 layers, each with increasing latency (e.g., between 50-60 ms at the core network layer 630, to 100 or more ms at the cloud data center layer). As a result, operations at a core network data center 635 or a cloud data center 645, with latencies of at least 50 to 100 ms or more, will not be able to accomplish many time-critical functions of the use cases 605. Each of these latency values are provided for purposes of illustration and contrast; it will be understood that the use of other access network mediums and technologies may further reduce the latencies. In some examples, respective portions of the network may be categorized as "close edge", "local edge". "near edge", "middle edge", or "far edge" layers, relative to a network source and destination. For instance, from the perspective of the core network data center 635 or a cloud data center 645, a central office or content data network may be considered as being located within a "near edge" layer ("near" to the cloud, having high latency values when communicating with the devices and endpoints of the use cases 605), whereas an access point, base station, on-premise server, or network gateway may be considered as located within a "far edge" layer ("far" from the cloud, having low latency values when communicating with the devices and endpoints of the use cases 605). It will be understood that other categorizations of a particular network layer as constituting a "close", "local", "near", "middle", or "far" edge may be based on latency, distance, number of network hops, or other measurable characteristics, as measured from a source in any of the network layers 600-640.

The various use cases 605 may access resources under usage pressure from incoming streams, due to multiple services utilizing the edge cloud. To achieve results with low latency, the services executed within the edge cloud 510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 510 may provide the ability to serve and respond to multiple applications of the use cases 605 (e.g., object tracking, video surveillance, connected cars, etc.) in real-time or near real-time, and meet ultra-low latency requirements for these multiple applications. These advantages enable a whole new class of applications (Virtual Network Functions (VNFs). Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 510 (network layers 600-640), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 510.

As such, the edge cloud 510 is formed from network components and functional features operated by and within edge gateway nodes, edge aggregation nodes, or other edge compute nodes among network layers 610-630. The edge cloud 510 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 510 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 510 may be servers, multi-tenant servers, appliance computing devices, and/or any other type of computing devices. For example, the edge cloud 510 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs. DC power inputs. AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers. I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 510 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 7:
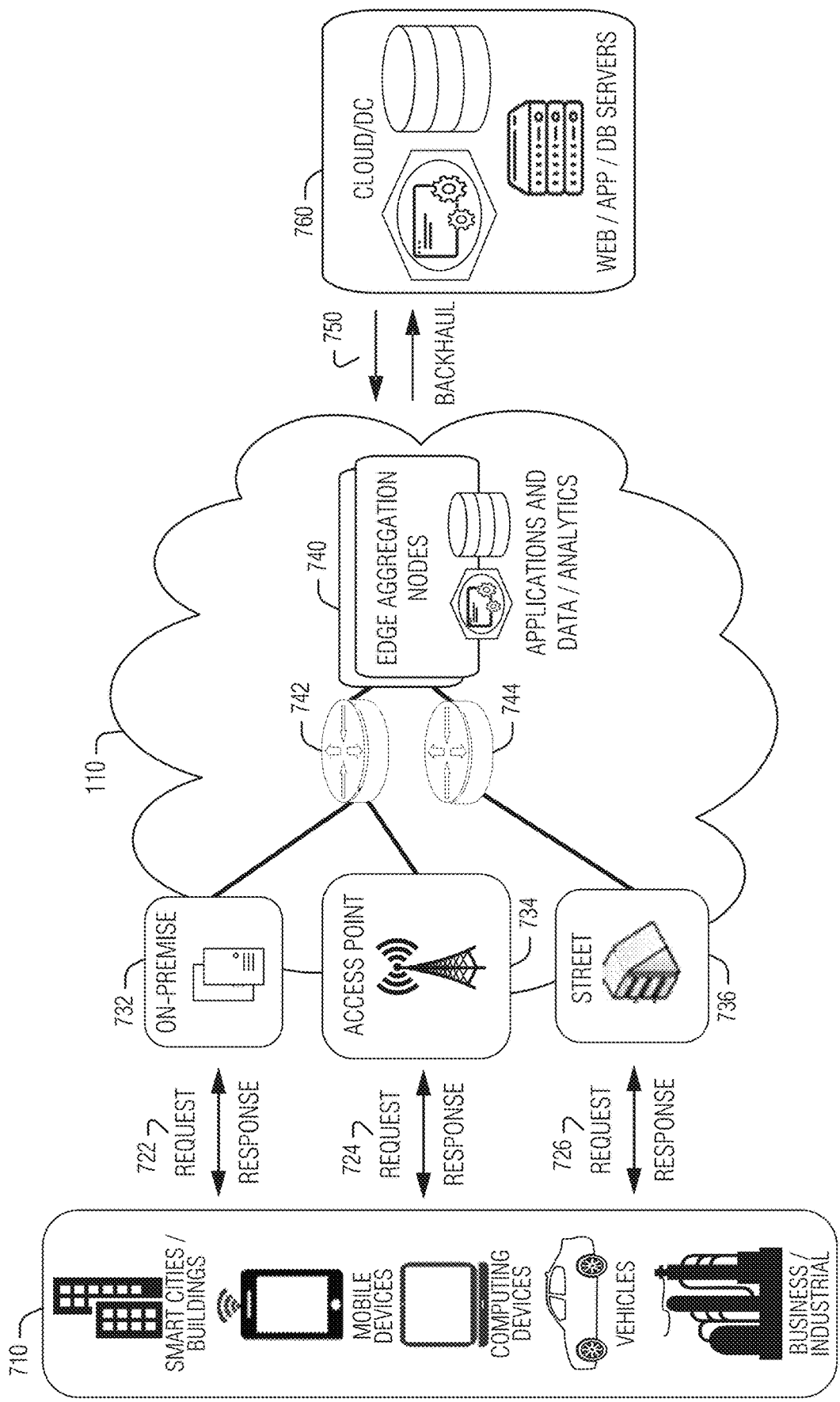
FIG. 7 illustrates an example approach for networking and services in an edge computing system.

In FIG. 7, various client endpoints 710 (in the form of mobile devices, computers, autonomous vehicles, business computing equipment, industrial processing equipment) exchange requests and responses that are specific to the type of endpoint network aggregation. For instance, client endpoints 710 may obtain network access via a wired broadband network, by exchanging requests and responses 722 through an on-premise network system 732. Some client endpoints 710, such as mobile computing devices, may obtain network access via a wireless broadband network, by exchanging requests and responses 724 through an access point (e.g., cellular network tower) 734. Some client endpoints 710, such as autonomous vehicles may obtain network access for requests and responses 726 via a wireless vehicular network through a street-located network system 736. However, regardless of the type of network access, the TSP may deploy aggregation points 742, 744 within the edge cloud 510 to aggregate traffic and requests. Thus, within the edge cloud 510, the TSP may deploy various compute and storage resources, such as at edge aggregation nodes 740, to provide requested content. The edge aggregation nodes 740 and other systems of the edge cloud 510 are connected to a cloud or data center 760, which uses a backhaul network 750 to fulfill higher-latency requests from a cloud/data center for websites, applications, database servers, etc. Additional or consolidated instances of the edge aggregation nodes 740 and the aggregation points 742, 744, including those deployed on a single server framework, may also be present within the edge cloud 510 or other areas of the TSP infrastructure.

Figure 8:
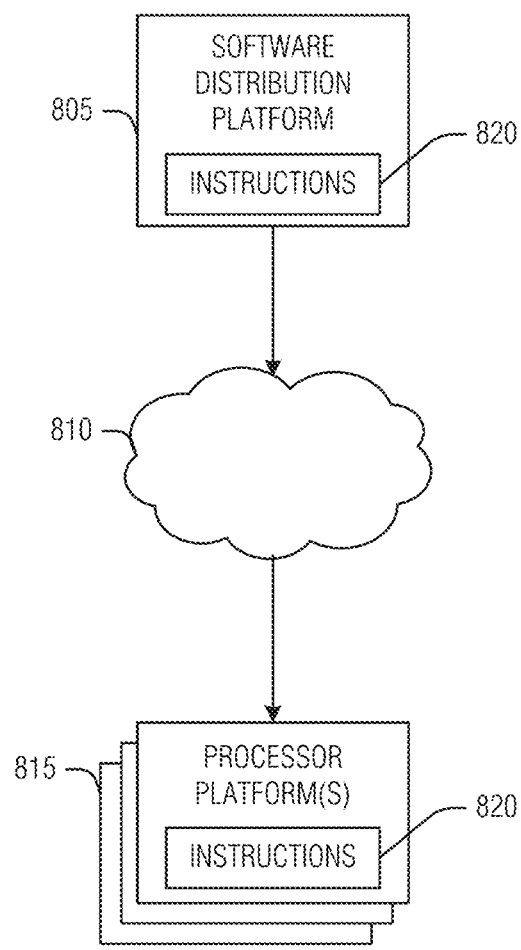
FIG. 8, illustrates an example software distribution platform, according to an embodiment.

FIG. 8 illustrates an example software distribution platform 805 to distribute software, such as the example computer readable instructions 820, to one or more devices, such as example processor platform(s) 815 or connected edge devices. The example software distribution platform 805 may be implemented by any computer server, data facility, cloud service, etc., capable of storing and transmitting software to other computing devices (e.g., third parties, the connected edge devices). Example connected edge devices may be customers, clients, managing devices (e.g., servers), third parties (e.g., customers of an entity owning and/or operating the software distribution platform 805). Example connected edge devices may operate in commercial and/or home automation environments. In some examples, a third party is a developer, a seller, and/or a licensor of software such as the example computer readable instructions 820. The third parties may be consumers, users, retailers. OEMs. etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 8, the software distribution platform 805 includes one or more servers and one or more storage devices. The storage devices store the computer readable instructions 820, which may correspond to the example computer readable instructions described herein. The one or more servers of the example software distribution platform 805 are in communication with a network 810, which may correspond to any one or more of the Internet or any of the example networks described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 820 from the software distribution platform 805. For example, the software, may be downloaded to the example processor platform(s) 815 (e.g., example connected edge devices), which are to execute the computer readable instructions 820 to implement the techniques described herein. In some examples, one or more servers of the software distribution platform 805 are communicatively connected to one or more security domains and/or security devices through which requests and transmissions of the example computer readable instructions 820 must pass. In some examples, one or more servers of the software distribution platform 805 periodically offer, transmit, and/or force updates to the software (e.g., the example computer readable instructions 820) to ensure improvements, patches, updates, etc. are distributed and applied to the software at the end user devices.

In the illustrated example of FIG. 8, the computer readable instructions 820 are stored on storage devices of the software distribution platform 805 in a particular format. A format of computer readable instructions includes, but is not limited to a particular code language (e.g., Java, JavaScript, Python, C, C#, SQL. HTML, etc.), and/or a particular code state (e.g., uncompiled code (e.g., ASCII), interpreted code, linked code, executable code (e.g., a binary), etc.). In some examples, the computer readable instructions 820 stored in the software distribution platform 805 are in a first format when transmitted to the example processor platform(s) 815. In some examples, the first format is an executable binary in which particular types of the processor platform(s) 815 can execute. However, in some examples, the first format is uncompiled code that requires one or more preparation tasks to transform the first format to a second format to enable execution on the example processor platform(s) 815. For instance, the receiving processor platform(s) 815 may need to compile the computer readable instructions 820 in the first format to generate executable code in a second format that is capable of being executed on the processor platform(s) 820. In still other examples, the first format is interpreted code that, upon reaching the processor platform(s) 820, is interpreted by an interpreter to facilitate execution of instructions.

Figure 9:
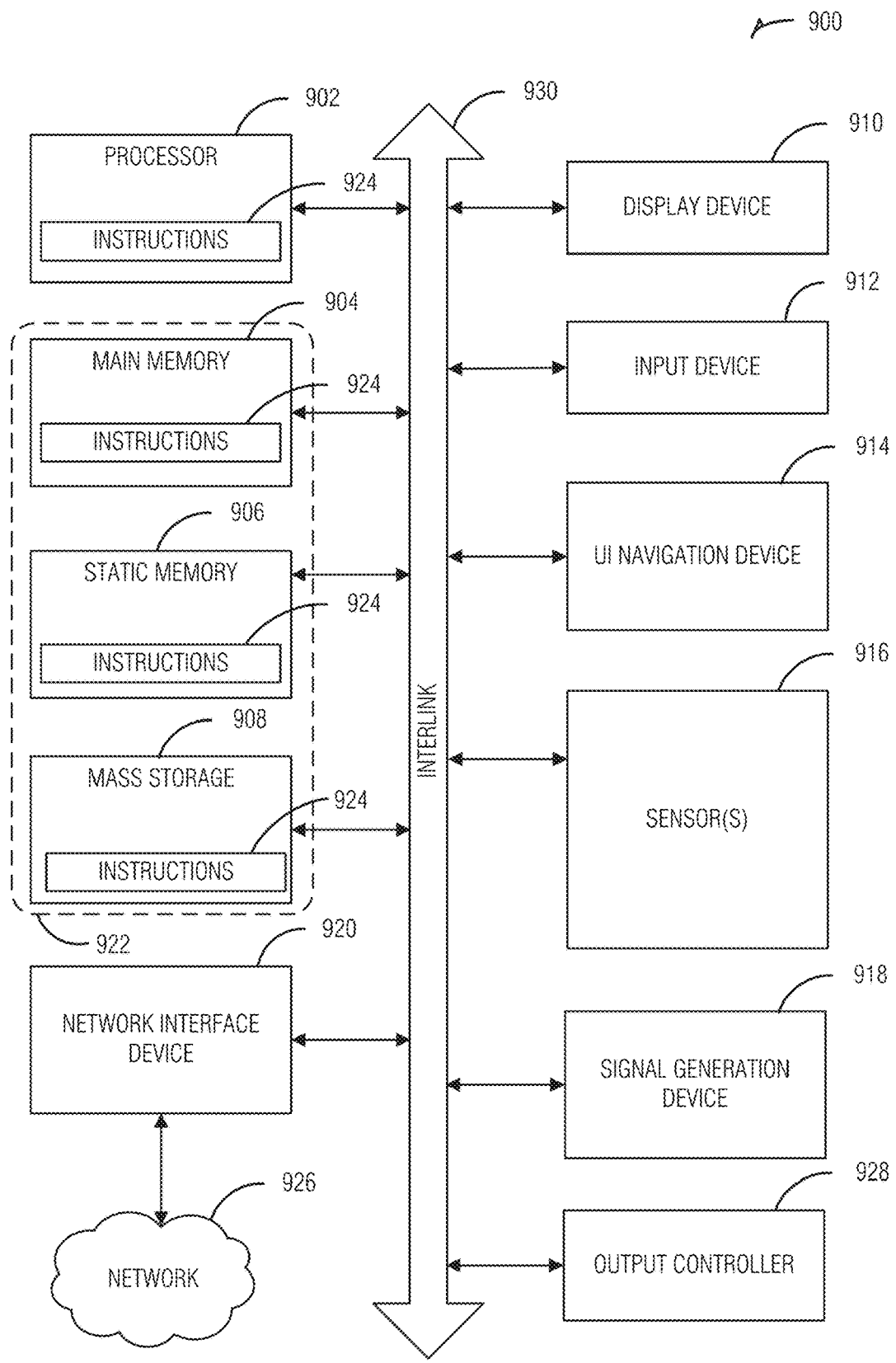
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB) a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 90 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drives, tape drives, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 922 may be representative of the instructions 924, such as instructions 924 themselves or a format from which the instructions 924 may be derived. This format from which the instructions 924 may be derived may include source code, encoded instructions (e.g., in compressed or encrypted form), packaged instructions (e.g., split into multiple packages), or the like. The information representative of the instructions 924 in the machine readable medium 922 may be processed by processing circuitry into the instructions to implement any of the operations discussed herein. For example, deriving the instructions 924 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 924.

In an example, the derivation of the instructions 924 may include assembly, compilation, or interpretation of the information (e.g., by the processing circuitry) to create the instructions 924 from some intermediate or preprocessed format provided by the machine readable medium 922. The information, when provided in multiple parts, may be combined, unpacked, and modified to create the instructions 924. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet). LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®. IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Additional Notes & Examples

Example 1 is a at least one machine-readable medium including instructions to implement an information centric network (ICN) protocol for federated learning, the instructions, when executed by processing circuitry, cause the processing circuitry to perform operations comprising: receiving, on a first interface, an interest packet to start a federated learning round, the interest packet including a participant criterion and a federated learning round expiration; creating an entry in a pending interest table (PIT) for the interest packet, the entry including the federated learning round expiration; forwarding, in accordance with a forwarding information base (FIB), the interest packet to a set of interfaces before the federated learning round expiration; receiving, from a second interface in the set of interfaces, a data packet from a node in response to the interest packet, the node meeting the participant criterion; and forwarding the data packet on the first interface in accordance with the PIT entry.

In Example 2, the subject matter of Example 1 includes, wherein forwarding the data packet on the first interface in accordance with the PIT entry includes discarding the interest packet when the interest packet is received after the federated learning round expiration.

In Example 3, the subject matter of Examples 1-2 includes, wherein the operations comprise: receiving, on the second interface, a second data packet in response to the interest packet; and discarding the second data packet when the second data packet is received after the federated learning round expiration.

In Example 4, the subject matter of Examples 1-3 includes, wherein the participant criterion is a time to complete the federated learning round.

In Example 5, the subject matter of Examples 1-4 includes, wherein the participant criterion is a round-trip communication time.

In Example 6, the subject matter of Examples 1-5 includes, wherein the operations comprise updating the FIB with the participant criterion, wherein the set of interfaces are selected based on the participant criterion in the FIB.

In Example 7, the subject matter of Example 6 includes, wherein the interest packet is one of a set of interest packets, the set of interest packets including: a common indication of the federated learning round; and a unique indication that is different between each of the set of interest packets.

In Example 8, the subject matter of Example 7 includes, wherein the unique indication uniquely identifies a participant.

In Example 9, the subject matter of Example 8 includes, wherein the interest packet follows a second interest packet, the second interest packet soliciting data packets of participants that can participate in the federated learning round.

In Example 10, the subject matter of Example 9 includes, wherein a device provides a second data packet in response to the second interest packet responsive to: meeting the participant criterion; and having available resources to participate in the federated learning round.

In Example 11, the subject matter of Examples 1-10 includes, wherein creating the entry in the PIT includes establishing a criterion for removal of the PIT entry, the criterion preventing removal of the PIT entry by a matching data packet before the criterion is met.

In Example 12, the subject matter of Example 11 includes, wherein the criterion is the federated learning round expiration.

In Example 13, the subject matter of Examples 11-12 includes, wherein the criterion is a count of data packets received in response to the interest packet.

In Example 14, the subject matter of Examples 1-13 includes, wherein a name of the interest packet includes a computation indication, the computation indication being one of a defined set of computation indications.

In Example 15, the subject matter of Examples 1-14 includes, wherein the data packet includes an update to a model, the update computed from data locally at a computation node, and the update being absent of the data used to calculate the update.

Example 16 is an information centric network (ICN) node with a protocol for federated learning, the ICN node comprising: a plurality of hardware interfaces including a first interface and a set of interfaces a memory including instructions; and processing circuitry that, when in operation, is configured by the instructions to: receive, on the first interface, an interest packet to start a federated learning round, the interest packet including a participant criterion and a federated learning round expiration; create an entry in a pending interest table (PIT) for the interest packet, the entry including the federated learning round expiration: forward, in accordance with a forwarding information base (FIB), the interest packet to the set of interfaces before the federated learning round expiration: receive, from a second interface in the set of interfaces, a data packet from a node in response to the interest packet, the node meeting the participant criterion: and forward the data packet on the first interface in accordance with the PIT entry.

In Example 17, the subject matter of Example 16 includes, wherein, to forward the data packet on the first interface in accordance with the PIT entry, the processing circuitry is configured to discard the interest packet when the interest packet is received after the federated learning round expiration.

In Example 18, the subject matter of Examples 16-17 includes, wherein the processing circuitry is configured to: receive, on the second interface, a second data packet in response to the interest packet; and discard the second data packet when the second data packet is received after the federated learning round expiration.

In Example 19, the subject matter of Examples 16-18 includes, wherein the participant criterion is a time to complete the federated learning round.

In Example 20, the subject matter of Examples 16-19 includes, wherein the participant criterion is a round-trip communication time.

In Example 21, the subject matter of Examples 16-20 includes, wherein the processing circuitry is configured to update the FIB with the participant criterion, wherein the set of interfaces are selected based on the participant criterion in the FIB.

In Example 22, the subject matter of Example 21 includes, wherein the interest packet is one of a set of interest packets, the set of interest packets including: a common indication of the federated learning round; and a unique indication that is different between each of the set of interest packets.

In Example 23, the subject matter of Example 22 includes, wherein the unique indication uniquely identifies a participant.

In Example 24, the subject matter of Example 23 includes, wherein the interest packet follows a second interest packet, the second interest packet solicitating data packets of participants that can participate in the federated learning round.

In Example 25, the subject matter of Example 24 includes, wherein a device provides a second data packet in response to the second interest packet responsive to: meeting the participant criterion; and having available resources to participate in the federated learning round.

In Example 26, the subject matter of Examples 16-25 includes, wherein, to create the entry in the PIT the processing circuitry is configured to establish a criterion for removal of the PIT entry, the criterion preventing removal of the PIT entry by a matching data packet before the criterion is met.

In Example 27, the subject matter of Example 26 includes, wherein the criterion is the federated learning round expiration.

In Example 28, the subject matter of Examples 26-27 includes, wherein the criterion is a count of data packets received in response to the interest packet.

In Example 29, the subject matter of Examples 16-28 includes, wherein a name of the interest packet includes a computation indication, the computation indication being one of a defined set of computation indications.

In Example 30, the subject matter of Examples 16-29 includes, wherein the data packet includes an update to a model, the update computed from data locally at a computation node, and the update being absent of the data used to calculate the update.

Example 31 is a method to implement an information centric network (ICN) protocol for federated learning, the method comprising: receiving, on a first interface, an interest packet to start a federated learning round, the interest packet including a participant criterion and a federated learning round expiration; creating an entry in a pending interest table (PIT) for the interest packet, the entry including the federated learning round expiration; forwarding, in accordance with a forwarding information base (FIB), the interest packet to a set of interfaces before the federated learning round expiration; receiving, from a second interface in the set of interfaces, a data packet from a node in response to the interest packet, the node meeting the participant criterion; and forwarding the data packet on the first interface in accordance with the PIT entry.

In Example 32, the subject matter of Example 31 includes, wherein forwarding the data packet on the first interface in accordance with the PIT entry includes discarding the interest packet when the interest packet is received after the federated learning round expiration.

In Example 33, the subject matter of Examples 31-32 includes, receiving, on the second interface, a second data packet in response to the interest packet; and discarding the second data packet when the second data packet is received after the federated learning round expiration.

In Example 34, the subject matter of Examples 31-33 includes, wherein the participant criterion is a time to complete the federated learning round.

In Example 35, the subject matter of Examples 31-34 includes, wherein the participant criterion is a round-trip communication time.

In Example 36, the subject matter of Examples 31-35 includes, updating the FIB with the participant criterion, wherein the set of interfaces are selected based on the participant criterion in the FIB.

In Example 37, the subject matter of Example 36 includes, wherein the interest packet is one of a set of interest packets, the set of interest packets including: a common indication of the federated learning round: and a unique indication that is different between each of the set of interest packets.

In Example 38, the subject matter of Example 37 includes, wherein the unique indication uniquely identifies a participant.

In Example 39, the subject matter of Example 38 includes, wherein the interest packet follows a second interest packet, the second interest packet solicitating data packets of participants that can participate in the federated learning round.

In Example 40, the subject matter of Example 39 includes, wherein a device provides a second data packet in response to the second interest packet responsive to: meeting the participant criterion; and having available resources to participate in the federated learning round.

In Example 41, the subject matter of Examples 31-40 includes, wherein creating the entry in the PIT includes establishing a criterion for removal of the PIT entry, the criterion preventing removal of the PIT entry by a matching data packet before the criterion is met.

In Example 42, the subject matter of Example 41 includes, wherein the criterion is the federated learning round expiration.

In Example 43, the subject matter of Examples 41-42 includes, wherein the criterion is a count of data packets received in response to the interest packet.

In Example 44, the subject matter of Examples 31-43 includes, wherein a name of the interest packet includes a computation indication, the computation indication being one of a defined set of computation indications.

In Example 45, the subject matter of Examples 31-44 includes, wherein the data packet includes an update to a model, the update computed from data locally at a computation node, and the update being absent of the data used to calculate the update.

Example 46 is a system to implement an information centric network (ICN) protocol for federated learning, the system comprising: means for receiving, on a first interface, an interest packet to start a federated learning round, the interest packet including a participant criterion and a federated learning round expiration; means for creating an entry in a pending interest table (PIT) for the interest packet, the entry including the federated learning round expiration: means for forwarding, in accordance with a forwarding information base (FIB), the interest packet to a set of interfaces before the federated learning round expiration: means for receiving, from a second interface in the set of interfaces, a data packet from a node in response to the interest packet, the node meeting the participant criterion; and means for forwarding the data packet on the first interface in accordance with the PIT entry.

In Example 47, the subject matter of Example 46 includes, wherein the means for forwarding the data packet on the first interface in accordance with the PIT entry include means for discarding the interest packet when the interest packet is received after the federated learning round expiration.

In Example 48, the subject matter of Examples 46-47 includes, means for receiving, on the second interface, a second data packet in response to the interest packet; and means for discarding the second data packet when the second data packet is received after the federated learning round expiration.

In Example 49, the subject matter of Examples 46-48 includes, wherein the participant criterion is a time to complete the federated learning round.

In Example 50, the subject matter of Examples 46-49 includes, wherein the participant criterion is a round-trip communication time.

In Example 51, the subject matter of Examples 46-50 includes, means for updating the FIB with the participant criterion, wherein the set of interfaces are selected based on the participant criterion in the FIB.

In Example 52, the subject matter of Example 51 includes, wherein the interest packet is one of a set of interest packets, the set of interest packets including: a common indication of the federated learning round; and a unique indication that is different between each of the set of interest packets.

In Example 53, the subject matter of Example 52 includes, wherein the unique indication uniquely identifies a participant.

In Example 54, the subject matter of Example 53 includes, wherein the interest packet follows a second interest packet, the second interest packet soliciting data packets of participants that can participate in the federated learning round.

In Example 55, the subject matter of Example 54 includes, wherein a device provides a second data packet in response to the second interest packet responsive to: meeting the participant criterion; and having available resources to participate in the federated learning round.

In Example 56, the subject matter of Examples 46-55 includes, wherein the means for creating the entry in the PIT include means for establishing a criterion for removal of the PIT entry, the criterion preventing removal of the PIT entry by a matching data packet before the criterion is met.

In Example 57, the subject matter of Example 56 includes, wherein the criterion is the federated learning round expiration.

In Example 58, the subject matter of Examples 56-57 includes, wherein the criterion is a count of data packets received in response to the interest packet.

In Example 59, the subject matter of Examples 46-58 includes, wherein a name of the interest packet includes a computation indication, the computation indication being one of a defined set of computation indications.

In Example 60, the subject matter of Examples 46-59 includes, wherein the data packet includes an update to a model, the update computed from data locally at a computation node, and the update being absent of the data used to calculate the update.

Example 61 is at least one machine-readable medium including instructions that, when executed by processing circuitry, cause the processing circuitry to perform operations to implement of any of Examples 1-60.

Example 62 is an apparatus comprising means to implement of any of Examples 1-60.

Example 63 is a system to implement of any of Examples 1-60.

Example 64 is a method to implement of any of Examples 1-60.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory machine-readable medium including instructions that, when executed by processing circuitry, cause the processing circuitry to perform operations comprising:
   receiving, on a first interface, an interest packet to start a federated learning round, the interest packet including a participant criterion and a federated learning round expiration;
   creating an entry in a pending interest table (PIT) for the interest packet, the entry including the federated learning round expiration;
   forwarding, in accordance with a forwarding information base (FIB), the interest packet to a set of interfaces before the federated learning round expiration;
   receiving, from a second interface in the set of interfaces, a data packet from a node in response to the interest packet, the node meeting the participant criterion; and
   forwarding the data packet on the first interface in accordance with the PIT entry.

2. The at least one machine-readable medium of claim 1, wherein forwarding the data packet on the first interface in accordance with the PIT entry includes discarding the interest packet when the interest packet is received after the federated learning round expiration.

3. The at least one machine-readable medium of claim 1, wherein the operations comprise:
   receiving, on the second interface, a second data packet in response to the interest packet; and
   discarding the second data packet when the second data packet is received after the federated learning round expiration.

4. The at least one machine-readable medium of claim 1, wherein the participant criterion is a time to complete the federated learning round.

5. The at least one machine-readable medium of claim 1, wherein the participant criterion is a round-trip communication time.

6. The at least one machine-readable medium of claim 1, wherein the operations comprise updating the FIB with the participant criterion, wherein the set of interfaces are selected based on the participant criterion in the FIB.

7. The at least one machine-readable medium of claim 6, wherein the interest packet is one of a set of interest packets, the set of interest packets including:
   a common indication of the federated learning round; and
   a unique indication that is different between each of the set of interest packets.

8. The at least one machine-readable medium of claim 7, wherein the unique indication uniquely identifies a participant.

9. The at least one machine-readable medium of claim 8, wherein the interest packet follows a second interest packet, the second interest packet soliciting data packets of participants that can participate in the federated learning round.

10. The at least one machine-readable medium of claim 9, wherein a device provides a second data packet in response to the second interest packet responsive to:
    meeting the participant criterion; and
    having available resources to participate in the federated learning round.

11. The at least one machine-readable medium of claim 1, wherein creating the entry in the PIT includes establishing a criterion for removal of the PIT entry, the criterion preventing removal of the PIT entry by a matching data packet before the criterion is met.

12. The at least one machine-readable medium of claim 11, wherein the criterion is the federated learning round expiration.

13. The at least one machine-readable medium of claim 11, wherein the criterion is a count of data packets received in response to the interest packet.

14. The at least one machine-readable medium of claim 1, wherein a name of the interest packet includes a computation indication, the computation indication being one of a defined set of computation indications.

15. The at least one machine-readable medium of claim 1, wherein the data packet includes an update to a model, the update computed from data locally at a computation node, and the update being absent of the data used to calculate the update.

16. An information centric network (ICN) node with a protocol for federated learning, the ICN node comprising:
    a plurality of hardware interfaces including a first interface and a set of interfaces;
    a memory including instructions; and
    processing circuitry that, when in operation, is configured by the instructions to:
       receive, on the first interface, an interest packet to start a federated learning round, the interest packet including a participant criterion and a federated learning round expiration;
       create an entry in a pending interest table (PIT) for the interest packet, the entry including the federated learning round expiration;
       forward, in accordance with a forwarding information base (FIB), the interest packet to the set of interfaces before the federated learning round expiration;

receive, from a second interface in the set of interfaces, a data packet from a node in response to the interest packet, the node meeting the participant criterion; and forward the data packet on the first interface in accordance with the PIT entry.

17. The ICN node of claim 16, wherein, to forward the data packet on the first interface in accordance with the PIT entry, the processing circuitry is configured to discard the interest packet when the interest packet is received after the federated learning round expiration.

18. The ICN node of claim 16, wherein the processing circuitry is configured to:

receive, on the second interface, a second data packet in response to the interest packet; and discard the second data packet when the second data packet is received after the federated learning round expiration.

19. The ICN node of claim 16, wherein the processing circuitry is configured to update the FIB with the participant criterion, wherein the set of interfaces are selected based on the participant criterion in the FIB.

20. The ICN node of claim 16, wherein, to create the entry in the PIT, the processing circuitry is configured to establish a criterion for removal of the PIT entry, the criterion preventing removal of the PIT entry by a matching data packet before the criterion is met.

21. The ICN node of claim 20, wherein the criterion is the federated learning round expiration.

22. The ICN node of claim 16, wherein a name of the interest packet includes a computation indication, the computation indication being one of a defined set of computation indications.

23. The ICN node of claim 16, wherein the data packet includes an update to a model, the update computed from data locally at a computation node, and the update being absent of the data used to calculate the update.

* * * * *